United States Patent
Bombacino et al.

(10) Patent No.: US 11,310,280 B2
(45) Date of Patent: *Apr. 19, 2022

(54) IMPLEMENTATION OF SELECTED ENTERPRISE POLICIES

(71) Applicant: International Business Machines Corporation, Armonk, NY (US)

(72) Inventors: Vinicio Bombacino, Rome (IT); Andrea Tortosa, Rome (IT); Stefania Oliverio, Rome (IT); Rosario Boccia, Salerno (IT); Fabio D'Alfonso, Rome (IT); Mario Rocco Garasto, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,025

(22) Filed: Jul. 16, 2019

(65) Prior Publication Data
US 2020/0322385 A1 Oct. 8, 2020

Related U.S. Application Data

(63) Continuation of application No. 16/376,369, filed on Apr. 5, 2019.

(51) Int. Cl.
*H04L 9/40* (2022.01)
*G06F 9/455* (2018.01)
(Continued)

(52) U.S. Cl.
CPC .......... *H04L 63/20* (2013.01); *G06F 9/45558* (2013.01); *G06Q 50/265* (2013.01);
(Continued)

(58) Field of Classification Search
CPC . H04L 63/20; H04L 63/0876; G06F 9/45558; G06F 2009/4557; G06F 2009/45595; G06Q 50/265
See application file for complete search history.

(56) References Cited

U.S. PATENT DOCUMENTS 9,383,983 B2 7/2016 Hung et al.
10,063,595 B1 8/2018 Qureshi et al.
(Continued)

FOREIGN PATENT DOCUMENTS

CN 102076125 A 5/2011
EP 2132643 B1 10/2017

OTHER PUBLICATIONS

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.
(Continued)

*Primary Examiner* — Fatoumata Traore
*Assistant Examiner* — Hamid Talaminaei
(74) *Attorney, Agent, or Firm* — Kelsey M. Skodje (57) ABSTRACT

Access is temporarily allowed to selected enterprise resources. A request to carry out an action is received from a private device. The private device is associated with an enterprise device, which has one or more enterprise policies in place. One or more steps for carrying out the requested action are defined, and it is determined that at least one policy from the enterprise policies is required for at least one of the steps. It is also determined that the at least one policy is in place on the private device. The private device is then allowed to carry out the requested action according to the at least one policy.

18 Claims, 6 Drawing Sheets

(51) Int. Cl.
*G06Q 50/26* (2012.01)
*H04L 29/06* (2006.01)

(52) U.S. Cl.
CPC .. *H04L 63/0876* (2013.01); *G06F 2009/4557* (2013.01); *G06F 2009/45595* (2013.01)

(56) References Cited

U.S. PATENT DOCUMENTS

| | | | |
|---|---|---|---|
| 10,402,546 B1* | 9/2019 | Qureshi | G06F 21/6209 |
| 2010/0144325 A1 | 6/2010 | Roundtree et al. | |
| 2013/0007245 A1* | 1/2013 | Malik | H04L 63/1433 |
| | | | 709/223 |
| 2014/0032691 A1* | 1/2014 | Barton | H04L 41/00 |
| | | | 709/206 |
| 2015/0271187 A1* | 9/2015 | Oz | H04L 63/1408 |
| | | | 726/22 |
| 2017/0339564 A1* | 11/2017 | Momchilov | G06F 9/45558 |
| 2018/0309782 A1* | 10/2018 | Adams | H04L 67/12 |
| 2018/0332050 A1 | 11/2018 | Deasy et al. | |
| 2020/0076902 A1* | 3/2020 | Huang | H04L 63/0281 |

OTHER PUBLICATIONS

Bombacino et al., "Implementation of Selected Enterprise Policies," U.S. Appl. No. 16/376,369, filed Apr. 5, 2019.
List of IBM Patents or Patent Applications Treated as Related, Signed Jul. 16, 2019, 2 pages.

\* cited by examiner

IMPLEMENTATION OF SELECTED ENTERPRISE POLICIES

BACKGROUND

The present disclosure relates to devices in an enterprise environment and more specifically to temporarily applying selected enterprise policies on a device outside of the enterprise environment.

Mobile computing devices can be used to access enterprise resources such as software applications and/or files via a network. These devices can be owned by enterprise organizations or individual members of the organization. The enterprise resources and mobile devices are protected from elements such as malware and viruses by enterprise policies installed on the mobile device before access can be granted to the network.

SUMMARY

Various embodiments are directed to a system, which includes at least one processing component, at least one memory component, and a set of enterprise policies. The system also includes an access control component configured to receive a request to carry out an action from a private device associated with an enterprise device. The enterprise device has one or more enterprise policies from the set of enterprise policies in place, and can include an application associated with the private device. Further, the system includes a mapping component configured to define one or more steps for carrying out the requested action, and determine that at least one policy from the one or more enterprise policies is required for at least one step from the one or more steps. Determining that the at least one policy is required can include providing a virtual machine that implements the one or more enterprise policies, setting the one or more enterprise policies to prohibit the one or more steps, and attempting to carry out the requested action on the virtual machine. Additionally, the mapping component can be configured to map the at least one policy to the requested action. The system also includes a device manager configured to determine that the at least one policy is in place on the private device, and allow the private device to carry out the requested action according to the at least one policy. In some embodiments, the device manager does not allow the private device to carry out actions other than the requested action. The device manager can be configured to determine that one or more policies from the at least one policy are in place on the private device, determine that one or more additional policies from the at least one policy are not in place on the private device, and implement only the one or more additional policies on the private device. The device manager can also be configured to determine that the requested action has been completed, and remove the one or more additional policies from the private device.

Further embodiments are directed to a method of allowing access to an enterprise environment. The method includes receiving a request to carry out an action from a private device associated with an enterprise device. The enterprise device has one or more enterprise policies in place, and can include an application associated with the private device. The method also includes defining one or more steps for carrying out the requested action, and determining that at least one policy from the one or more enterprise policies is required for at least one step from the one or more steps. The at least one policy can then be mapped to the requested action. Further, the method includes determining that the at least one policy is in place on the private device, and allowing the private device to carry out the requested action according to the at least one policy. In some embodiments, the private device is not allowed to carry out actions other than the requested action. The method can also include determining that a policy from the at least one policy is not in place on the private device, and implementing the policy on the private device, as well as determining that the requested action has been completed, and removing the policy from the private device. Determining that the at least one policy is required can include providing a virtual machine that implements the one or more enterprise policies, setting the one or more enterprise policies to prohibit the one or more steps, and attempting to carry out the requested action on the virtual machine.

Additional embodiments are directed to a computer program product, which can include a computer readable storage medium having program instructions embodied therewith, the program instructions executable by a processor to cause the device to perform a method. The method includes receiving a request to carry out an action from a private device associated with an enterprise device. The enterprise device has one or more enterprise policies in place, and can include an application associated with the private device. The method also includes defining one or more steps for carrying out the requested action, and determining that at least one policy from the one or more enterprise policies is required for at least one step from the one or more steps. The at least one policy can then be mapped to the requested action. Further, the method includes determining that the at least one policy is in place on the private device, and allowing the private device to carry out the requested action according to the at least one policy. The method can also include determining that a policy from the at least one policy is not in place on the private device, and implementing the policy on the private device, as well as determining that the requested action has been completed, and removing the policy from the private device. Determining that the at least one policy is required can include providing a virtual machine that implements the one or more enterprise policies, setting the one or more enterprise policies to prohibit the one or more steps, and attempting to carry out the requested action on the virtual machine.

DETAILED DESCRIPTION

An enterprise is a unit of economic organization or activity, such as a commercial and/or industrial business.

Enterprises can be owned by private citizens, governments, or combinations thereof. The information technology (IT) infrastructures for enterprises and other organizations (e.g., university and hospital systems) can allow employees or other individual users to access enterprise resources (e.g., private networks, software applications, web browser extensions, databases, documents, etc.) via a variety of computing devices (e.g., laptop or desktop computers, mobile devices, etc.). The devices can be owned by the organization or the users. However, there is often a set of policies in place that must be implemented on the devices in order for access to enterprise resources to be granted. The policies can relate to security (e.g., data encryption, malware and virus detection, password strength, etc.), use agreements, data privacy regulations, IT administrator access, etc.

Devices accessing enterprise resources can be used within the enterprise environment (e.g., connected via a private network with all applicable policies implemented). However, some devices can also be used in external locations without trusted network connections, such as when employees work remotely. In these instances, there can be policies for connecting to the enterprise environment securely. For example, policies can require that devices using external networks must access the enterprise environment via a virtual private network (VPN). Additionally, there can be policies related to IT administrator access to devices. For example, if a device with access to enterprise resources is lost or stolen, the IT administrator can be allowed to remotely wipe all or part of the device's data.

Implementation of enterprise policies on devices having access to the enterprise environment is an important part of protecting enterprise resources. This is particularly true when devices are used for both enterprise and private purposes. Many business enterprises have "bring your own device (BYOD)" policies, which allow employees to use their own private devices for work. The private devices are generally pre-registered and configured to implement enterprise policies. However, there can be instances in which a user needs to access enterprise resources, but cannot access a device configured according to enterprise policies. For example, the user may have a pre-registered and configured laptop that she uses at work and at home. However, while the user is on vacation, she may only pack a tablet computer that she owns and has not had configured for use within the enterprise environment. A need to connect to the enterprise environment while the user is on vacation may then arise. For example, the user may remember that she needs access to her work email to send a document that is saved in an enterprise shared drive. However, a connection to the enterprise private network may be required in order to configure the tablet computer to allow access. Additionally, even if the tablet computer can be properly configured according to the enterprise policies, this can be a time consuming process.

Further, the tablet computer may not be capable of implementing the policies. For example, certain policies may require new security software or updates to the operating system of the tablet computer. If the tablet computer does not have the storage capacity for these requirements, at least one of the policies may not be implemented. In another example, policies can be prevented from implementation when the operating system of the tablet computer is not compatible with one or more policy requirements. However, it is often the case that not all of the enterprise policies are applicable to every action taken in the enterprise environment. For example, accessing certain types of data (e.g., customer data) stored in the enterprise environment may require stronger encryption and more strict use agreements than accessing other types of data. However, the inability of a device to apply every policy may prevent the user from connecting to the enterprise environment or accessing enterprise resources.

Techniques for allowing a private computing device to temporarily obtain limited access to enterprise resources are disclosed herein. The type of access granted to the private device is limited to one or more actions requested by a user. The minimum quantity of enterprise policies required to carry out the requested actions are implemented on the private device. After the action has been completed, the enterprise policies are removed from the private device. The temporary implementation of the minimum number of enterprise policies necessary for carrying out an action allows the action to be carried out more quickly and with fewer computing resources than implementation of all enterprise policies would. This provides greater flexibility and convenience to the user, and protects enterprise resources by limiting exposure to the external network.

Figure 1:
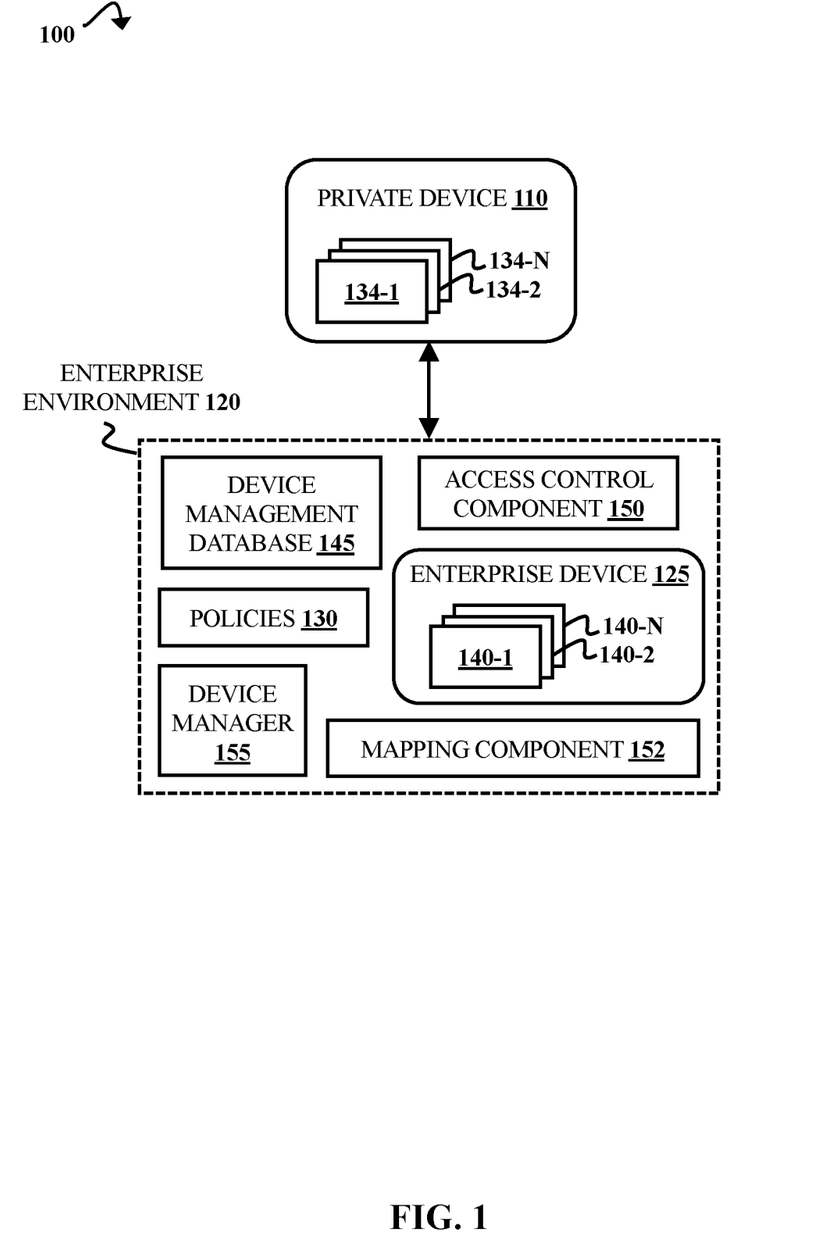
FIG. 1 is a block diagram illustrating an enterprise access environment.

FIG. 1 is a block diagram illustrating an enterprise access environment 100, according to some embodiments of the present disclosure. Enterprise access environment 100 includes a private device 110 and an enterprise environment 120. The enterprise environment 120 is an IT infrastructure for an enterprise. The enterprise environment 120 includes hardware, software, and network resources for managing and operating the enterprise infrastructure. For simplicity, the enterprise environment 120 illustrated herein is a business enterprise. However, the enterprise environment 120 can also be an IT infrastructure for a non-profit organization (e.g., an academic institution, government department or agency, charitable foundation, etc.) or any organization that provides IT resources to its members (e.g., a professional association or healthcare system). In some embodiments, the enterprise is an organization having greater than about 500 members (e.g., employees, contractors, volunteers, etc.). However, the enterprise can also be a smaller organization, such as a small or mid-size business having fewer than about 500, 200, or 25 members.

The private device 110 is a computing device associated with a user who operates and is associated with an enterprise device 125 within the enterprise environment 120. The enterprise device 125 operates within the enterprise environment 120 through a secure internet connection, virtual private network (VPN) connection, intranet and/or extranet connection, etc. The enterprise device 125 is configured according to a set of enterprise policies 130 in the enterprise environment 120, while the private device 110 is not. The enterprise policies 130 are discussed in greater detail below. In some embodiments, the private device 110 and/or enterprise device 125 are mobile devices (e.g., a smartphone, wearable device, tablet computer, laptop or notebook computer, etc.). However, the private device 110 and enterprise device 125 can be any type of computing device used by the user, such as a desktop computer.

The private device 110 includes one or more software applications 134-1, 134-2, 134-N (collectively, private applications 134). The private applications 134 include any applications installed on the private device 110. Examples of private applications 134 can include security software, web browsers, password managers, financial software, business intelligence software, desktop publishing software, formula editors, email clients, personal information managers, notetaking software, collaborative software, communication software, project management software, web log analysis software, raster and/or vector graphic editors, image viewers, music editors, video editors, diagramming software, computer-aided design software, internet-based telephone services, word processors, spreadsheets, presentation programs, etc. Additional examples can include mobile software applications for social media accounts, weather forecasts, instant messaging, etc.

The enterprise device 125 also includes one or more software applications 140-1, 140-2, and 140-N (collectively, enterprise applications 140). The enterprise applications 140 are implemented according to enterprise policies 130 and used for enterprise purposes. However, it should be noted that private applications 134 can also be used for enterprise purposes according to enterprise policies 130. This is discussed in greater detail below. The enterprise applications 140 can be custom enterprise software or commercially available software. However, the enterprise device 125 can also include non-enterprise applications (not shown). For example, the enterprise device 125 can be used as a secondary private device for non-enterprise purposes (e.g., according to BYOD policies). In these instances, the user can operate non-enterprise applications on the enterprise device 125 without connecting to the enterprise environment 120 and, optionally, without applying enterprise policies 130.

In some embodiments, one or more enterprise applications 140 allow the user to view, modify, delete, download, and/or upload files stored in the enterprise environment 120. These applications 140 can include file managers, file sharing services, cloud services, email clients, database software, etc. The files can be stored in the memory of the enterprise device 125, on another device belonging to the enterprise organization (e.g., one or more private servers), and/or in a cloud storage environment.

Additional examples of enterprise applications 140 can include financial software (e.g., for accounting, pipeline tracking, asset management, fund management, and/or data warehousing), business intelligence applications (e.g., report generators, digital dashboards, online analytical processing software, data mining software, local information systems, data cleansing software, business activity monitoring software, etc.). The enterprise applications 140 can also include desktop publishing software, formula editors, email clients, personal information managers, notetaking software, collaborative software, communication software, project management software, web log analysis software, raster and/or vector graphic editors, image viewers, music editors, video editors, diagramming software, computer-aided design software, internet-based telephone services, word processors, spreadsheets, presentation programs, etc. Additional examples of applications that can be used on the enterprise device 140 are discussed in greater detail above with respect to the private applications 134.

The set of enterprise policies 130 includes enterprise policies 130 that apply to access and implementation of various enterprise resources, such as private data and enterprise applications 140. In some embodiments, the enterprise policies 130 include default policies, which apply to all action requests. For example, a virtual private network (VPN) connection can be required in order for any device to access enterprise resources from outside of the enterprise environment 120. Additional examples of default enterprise policies 130 can specify password strength, computer-use agreements, required operating system versions, required security software, etc. Policies 130 can also vary according to user and/or subgroup within the enterprise organization. For example, a subgroup can require two-factor authentication in addition to the organization-wide password strength policy. Examples of subgroups can include departments (e.g., sales, legal, marketing, finance, research and development, etc.) and access levels (e.g., based on degree or type of access to confidential materials).

Enterprise policies 130 can also be specific to particular actions. For example, enterprise policies 130 can apply to accessing data. These enterprise policies 130 can specify what data particular users and/or subgroups can access. Further, different types of data may have different enterprise policies 130 for access, collection, processing, storage, etc. For example, some types of data (e.g., personally identifiable data, cardholder data, and protected health information) require handling and protection according to various state, federal, and/or international laws and regulations. Enterprise policies 130 can also apply to accessing enterprise applications 140. For example, enterprise policies 130 can specify operating system requirements for downloading enterprise applications 140. Enterprise policies 130 can also specify which extensions can be installed in a web browser. Additional examples of enterprise policies 130 are discussed in greater detail with respect to FIGS. 2A and 2B.

The device management database 145 maintains a list of devices recognized by the enterprise environment 120. This list also includes user information for users associated with the devices. In some embodiments, a device has a single user, but there can be more than one user for a device in other embodiments. The user information can include names, employee serial number, department or group membership, job title, etc. Additionally, the user information can include a list of actions the user is authorized to take according to the enterprise policies 130. The enterprise device 145 and, optionally, the private device 110 are included on the list. A record of the private device 110 can be mapped to the enterprise device 145 and/or user. In some embodiments, the user adds the private device 110 to the list. For example, the user can sign into an enterprise account on the private device 110 using multifactor authentication that includes a verification code sent to the enterprise device 125. The enterprise applications 140 can also include an application associated with the private device 110. Further, the private device 110 can be approved and/or added to the list of trusted devices by a system administrator.

The access control component 150 determines whether to allow external devices (e.g., the private device 110) to connect to the enterprise environment 120. When a user attempts to connect to the enterprise environment 120 from the private device 110, the access control component 150 authenticates the private device 110. For example, the access control component 150 can determine whether the private device 110 is mapped to the user or enterprise device 125 in the device management database 145. In some embodiments, the access control component 150 can also grant access to the private device 110 when the enterprise device 125 includes a record identifying the private device 110 (e.g., in an enterprise application 140 associated with the private device 110).

The access control component 150 can also authenticate the user before granting access to the enterprise environment 120. For example, the user can enter a user or group identifier (ID) and password for an account associated with the enterprise device 125. In some embodiments, the password is a passcode, passphrase, or non-text-based password (e.g., a graphical password, cursor movement-based password, or cognitive password). Additionally, authentication can be based on two-factor authentication, time synchronized one-time passwords, public key cryptography, single sign-on technology, biometric authentication, two-dimensional (2D) keys, and/or password-free data encryption.

The enterprise environment 120 also includes a mapping component 152. The mapping component 152 determines which enterprise policies 130 are required in order to carry out actions that can be requested by the private device 110. This can be carried out before or after the access control component 150 verifies the private device 110. The mapping component 152 defines the individual steps involved in actions carried out by the enterprise device 125. Then, the mapping component 152 determines whether there are enterprise policies 130 that must be implemented in order to carry out at least one of the action steps.

For example, the mapping component 152 can provide a virtual machine that implements all of the enterprise policies 130 in place on the enterprise device 125. The enterprise policies 130 implemented on the virtual machine are set to prohibit all associated action steps. The action is then attempted on this virtual machine. If a policy from the enterprise policies 130 is required to carry out an action step, a warning prompt is generated indicating that the policy is required. The mapping component 152 maps these required enterprise policies 130 to the action. Operations carried out by the mapping component 152 are discussed in greater detail with respect to FIG. 2A.

The enterprise environment 120 also includes a device manager 155. The device manager 155 determines whether the private device 110 is properly configured according to the enterprise policies 130 required for a requested action. The private device 110 can have at least one of the required enterprise policies 130 already in place. However, if there are required enterprise policies 130 that are not already in place, the device manager 155 implements the required enterprise policies 130 on the private device 110. When all required enterprise policies 130 are in place on the private device 110, the device manager 155 allows the private device 110 to carry out the requested action. When the requested action has been completed, the device manager 155 removes implemented enterprise policies 130 and associated data from the private device 110.

Figure 2A:
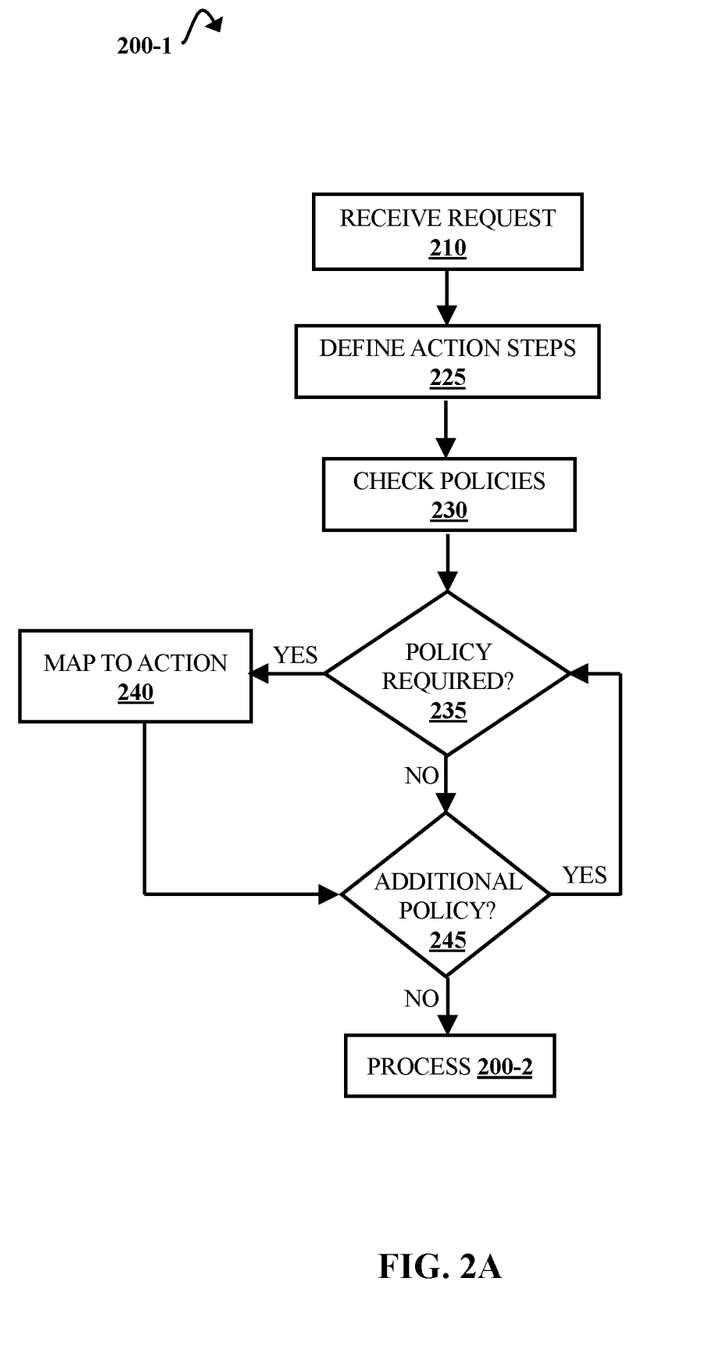
FIG. 2A is a flow diagram illustrating a process of configuring a private device, according to some embodiments of the present disclosure.

FIG. 2A is a flow diagram illustrating a process 200-1 of configuring a private device 110, according to some embodiments of the present disclosure. To illustrate process 200-1, but not to limit embodiments, FIG. 2A is described within the context of enterprise access environment 100 of FIG. 1. Where elements shown in FIG. 2A are identical to elements shown in FIG. 1, the same reference numbers are used in both Figures.

In process 200-1, a request to carry out an action in the enterprise environment 120 is received. This is illustrated at operation 210. The access control component 150 receives the request when it is entered by a user via the private device 110. In some instances, an action request is automatically sent to the access control component 150 when the user attempts an action on the private device 110 that requires enterprise resources to be carried out (e.g., opening a protected file or accessing an enterprise email account). The action request can optionally include a request to access the enterprise environment 120 followed by a request to carry out a particular action. For example, the user can click on an access request button before or after signing into an enterprise user account via a web browser or other application (e.g., a file manager, email client, document editor, etc.) from the private applications 134. When access has been granted, the user can then select an action to request. However, before access is granted, the access control component 150 verifies the private device. The access control component 150 can verify that the private device 110 is a recognized device when a request is received. However, the verification can occur in a subsequent step in other embodiments. This is discussed in greater detail below.

Individual steps involved in carrying out the requested action are defined. This is illustrated at operation 225. For example, the user can request access to a document via a file manager application from the private applications 134. The mapping component 152 can then determine that this action includes steps such as connecting to the enterprise environment 120 via an internet connection, establishing a connection to a shared drive in the enterprise environment 120, opening a folder containing the requested file, and downloading the file. In another example, an action can be accessing the enterprise environment 120 for an online meeting via a web conferencing application. The mapping component 152 can define steps for this action that include receiving user login information, running a session initiation protocol (SIP) to join the online meeting, accessing the microphone and/or camera on the private device 110, allowing the user to download and/or upload files relevant to the meeting, etc.

It should be noted that, while operation 225 is illustrated as occurring after an action request is received at operation 210, in some embodiments steps in an action are defined without having previously received an action request from the private device 110. Instead, process 200-1 begins at operation 225 and action steps are defined for an action that can be carried out by the enterprise device 125. Process 200-1 can be repeated for all or some of these actions. This can occur periodically in order to account for updates to the enterprise device 125. When process 200-1 begins at operation 225, omitting operation 210, an action request can be received at another time (e.g., after process 200-1 is finished). This is discussed in greater detail with respect to FIG. 2B.

It is then determined whether there are enterprise policies 130 that are required in order to carry out one or more of the defined steps in the action. This is illustrated at operation 230. The mapping component 152 checks the enterprise policies 130 in order to determine whether there are enterprise policies 130 applicable to the action steps, the user, and/or the type of enterprise device 125. A virtual machine that applies all enterprise policies 130 that are in place on the enterprise device 125 can be used for this determination. In some embodiments, access to the virtual machine is provided to the private device 110, such as in instances where the private device 110 is verified when an action request is received at operation 210 or after a subsequent verification operation (see, e.g., FIG. 2B). On the virtual machine, all enterprise policies 130 are set to forbid applicable action steps. The action is then attempted on the virtual machine. When enterprise policies 130 are required for an action step, warning prompts requiring permission to allow the step are generated. Each step is then allowed when prompted until the virtual machine reaches a successful final status for the action.

For example, the attempted action can be joining an online meeting via a web conferencing application. In this example, a policy from the enterprise policies 130 that is related to microphone access can result in a warning prompt requiring microphone access. Another policy from these enterprise policies 130 can require specific VPN software in order to establish a connection to the enterprise environment 120. A policy can also require identification of an unexpired VPN certificate issued to the private device 110 before a VPN connection can be established.

However, there can be various enterprise policies 130 implemented on the enterprise device 125 that are not required in order to carry out the action. For example, there can be a policy that only allows authorized users to upload files to a group drive. This policy would not result in a warning prompt if the online meeting does not involve accessing the group drive. In another example, there can be a policy that directs handling of customer data (e.g., names, financial information, addresses, etc.). For example, the policy can require that the user sign a computer-use agreement indicating that the data will be handled according to all relevant laws and regulations. Another policy can require disk encryption when downloading data. If the action does not include downloading or accessing customer data, the customer data use agreement policy will not result in a warning prompt during the action attempt. However, if the action does require downloading data other than customer data, the disk encryption policy will still result in a warning prompt.

Enterprise policies 130 that are required to carry out the action are identified. This is illustrated at operation 235. The mapping component 152 selects a policy from the enterprise policies 130. If the selected policy applies to at least one step in the action (e.g., if a warning prompt was generated during an action attempt at operation 230), the mapping component 152 determines that the policy is required for the action. However, if the policy was not found to apply to at least one step, the mapping component 152 determines that the policy is not required for the action.

If the selected policy is required for at least one step in the action, the policy is mapped to the action. This is illustrated at operation 240. When the mapping operation 240 is complete for the selected policy, or if the selected policy is not found to be required for the action, it is determined whether there are additional enterprise policies 130 implemented on the enterprise device 125. This is illustrated at operation 245. If one or more additional enterprise policies 130 are found, a next policy is selected from these enterprise policies 130 and process 200-1 returns to operation 235 to determine whether the next policy is required for a step in the action. Process 200-1 continues until no additional enterprise policies 130 are found at operation 245. Further, process 200-1 can be repeated for additional actions (e.g., when a request is not received at operation 210 or when requests for more than one action are received).

Figure 2B:
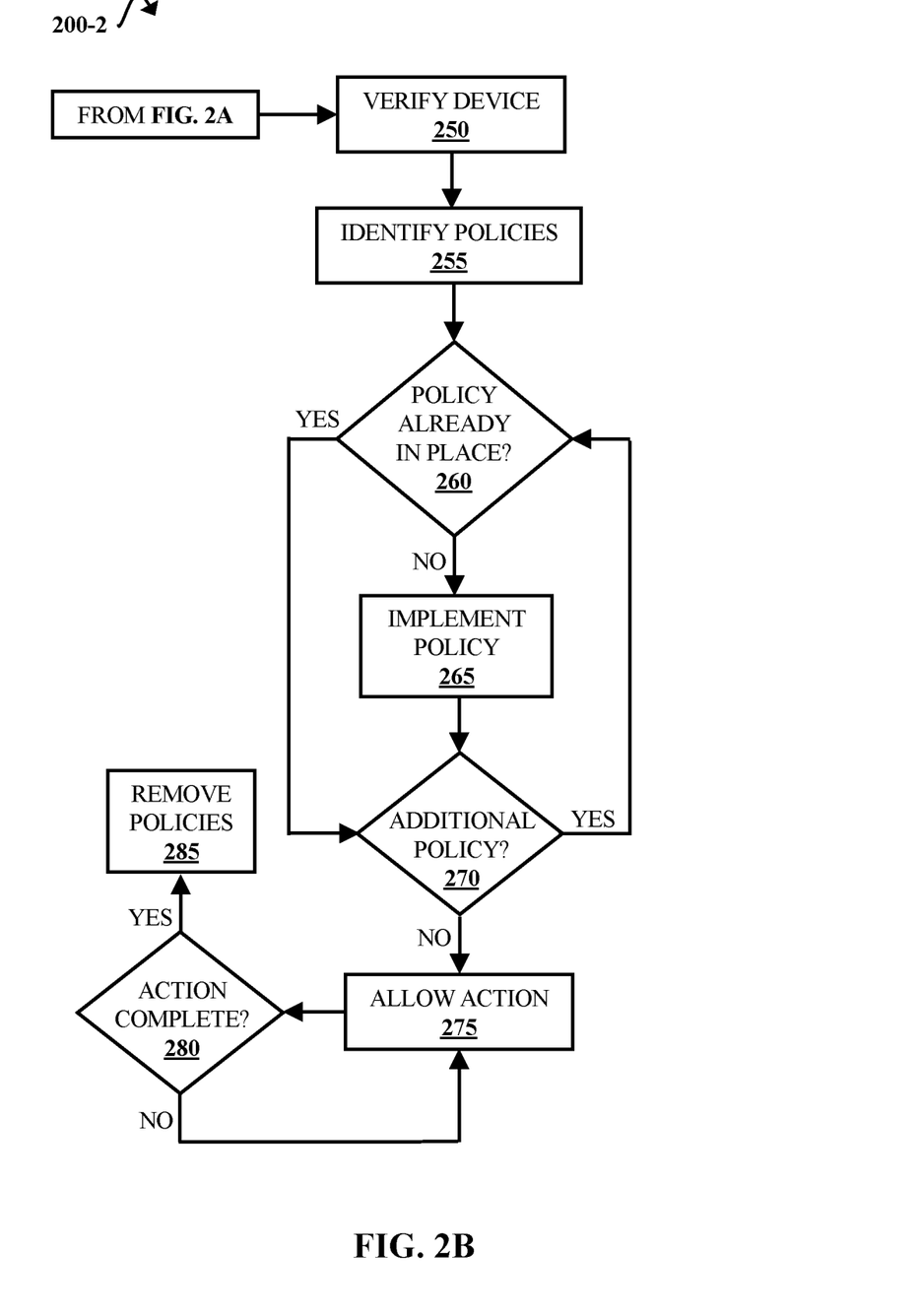
FIG. 2B is a flow diagram illustrating a process of granting a private device access to an enterprise environment, according to some embodiments of the present disclosure.

Upon completing the configuration in process 200-1, process 200-2 can begin. Process 200-2 is illustrated in FIG. 2B. However, in some embodiments process 200-2 does not begin upon completion of process 200-1. For example, if an attempt to carry out a requested action is not detected within a preset length of time (e.g., five minutes, ten minutes, thirty minutes, one hour, etc.), the device manager 155 can end process 200-1 and require the user to enter a new access request before accessing enterprise applications 140, at which point process 200-1 begins again at operation 210. Process 200-2 can also be omitted if the user or an administrator cancels the access request or when the private device 110 enters a locked (e.g., when the private device 110 screen is locked or a screensaver activates) or idle (e.g., when no activity is detected within a preset time interval) state. Additionally, in instances where the action request at operation 210 is omitted from process 200-1, process 200-2 can begin when an action request or an access request is subsequently received.

FIG. 2B is a flow diagram illustrating a process 200-2 of granting a private device 110 access to an enterprise environment 120, according to some embodiments of the present disclosure. To illustrate process 200-2, but not to limit embodiments, FIG. 2B is described within the context of enterprise access environment 100 of FIG. 1. Where elements shown in FIG. 2B are identical to elements shown in FIG. 1, the same reference numbers are used in both Figures.

Prior to granting access, the private device 110 is verified to determine that the device 110 is a recognized device. This is illustrated at operation 250. The private device 110 can be verified when process 200-1 is complete and a request for access to the enterprise environment 120 and/or an action request have been received. If an access request is received prior to an action request, the action request can optionally be received after the verification is complete. In other embodiments, the private device 110 is verified when an action request is received at operation 210 of process 200-1 (FIG. 2A).

In the verification operation, the access control component 150 determines whether the private device 110 is associated with the enterprise device 125. In some embodiments, the access control component 150 verifies the private device 110 by recognizing the media access control (MAC) address and, optionally, internet protocol (IP) address of the private device 110. For example, the private device 110 can be verified when its MAC address is located on a list of recognized devices stored in the device management database 145 or the enterprise device 125 (e.g., in an enterprise application 140 associated with the private device 110).

The private device 110 verification can also include user authentication. For example, the user can be prompted to enter a user ID and at least one authentication factor. In some embodiments, the user ID must be in a recognized format, such as an enterprise domain email address (e.g., username@businessenterprise.com). However, various user ID formats can be used (e.g., a unique name, serial number, image, symbol, etc.). Examples of user authentication factors can include a written or typed password or passphrase, an emailed confirmation code, a traced pattern, an electroencephalographic (EEG) signal, etc. User authentication factors can also include facial recognition techniques and/or other biometric measurements (e.g., measurements of a retina pattern, a voice pattern, a palm- or fingerprint, a vein match, etc.). Additional examples of user authentication factors are discussed in greater detail with respect to FIG. 1.

Instances in which the private device 110 is not recognized by the access control component 150 are not illustrated in FIG. 2B. However, if the private device 110 cannot be verified (e.g., if no device ID is found on the enterprise device 125 or in the device management database 145) when an attempt to connect to the enterprise environment 120 is detected, the access control component 150 may not allow the private device to connect to the enterprise environment 120. The user can be notified of the access denial by an error message and, optionally, be given one or more additional opportunities to enter a request. Additionally, the user can receive a message offering connection troubleshooting instructions and/or contact information for the enterprise IT department.

The enterprise policies 130 required to carry out a requested action are identified. This is illustrated at operation 255. For an action requested by the private device 110, the device manager 155 locates required enterprise policies 130, which were mapped to the requested action during operation 240 of process 200-1 (FIG. 2A). The required enterprise policies 130 can be implemented on the private device 110 before steps in the requested action can be carried out. However, there can be required enterprise policies 130 that prohibit one or more steps in the requested action without preventing the entire requested action from being carried out. This is discussed in greater detail below.

It is determined whether a policy from the required enterprise policies 130 mapped to the requested action is already in place on the private device 110. This is illustrated at operation 260. At least one of the required enterprise policies 130 may already be in place on the private device 110. For example, required software for establishing a VPN connection according to the enterprise policies 130 may already be installed on the private device 110. The private device 110 may also use a password that meets the security standards of the enterprise policies 130.

By determining whether required enterprise policies 130 are in place on the private device 130, the device manager 155 can determine the minimum number of enterprise policies 130 that must be implemented on the private device 110 by the device manager 155. This is the number of required enterprise policies 130 mapped to the requested action that are not already in place on the private device 110. The minimum number of enterprise policies 130 can include some or all of the enterprise policies 130. Further, in some embodiments all of the enterprise policies 130 are already in place on the private device 110, and the device manager 155 does not implement any enterprise policies 130.

In some embodiments, the device manager 155 scans the private device 110 in order to locate the selected policy from the required enterprise policies 130 on the private device 110 at operation 260. In other embodiments, the device manager 155 identifies the selected policy from a list of enterprise policies 130 in place on the private device 110 in the device management database 145. For example, information about enterprise policies 130 in place on the private device 110 can be stored in the device management database 145 after being collected by the device manager 155 in an earlier scan of the private device 130. In these instances, the scan can take place when the user enters an action or access request. However, the user can also select an option to carry out the scan at regular intervals.

If the policy selected at operation 260 is not already in place on the private device 110, the policy is implemented on the private device 110. This is illustrated at operation 265. In some embodiments, the device manager 155 automatically implements the policy. For example, the user can select an option for allowing implementation of all or selected enterprise policies 130 when entering the access request. However, the device manager 155 can also generate a notification indicating that the policy is missing from the private device 110. The notification can include an option to allow the policy to be implemented, which the user can accept or decline. In the online meeting example discussed above, the notification can ask for permission to access the private device's 110 microphone. If the user allows the policy, the policy is implemented on the private device 110.

Instances in which the user does not allow the policy to be implemented are not illustrated in FIG. 2B. However, if the user does not allow the policy, the device manager 150 can prohibit one or more steps in the requested action. If a prohibited step is necessary for the requested action to occur (e.g., establishing a secure connection to an enterprise environment 120 network), this can result in the action request being denied. However, in some embodiments only an individual step related to the policy is prohibited, while the remaining steps in the requested action are allowed to proceed. For example, if the user does not agree to a policy granting access to the private device's 110 camera when joining an online meeting, the requested action of joining the meeting can still be allowed without video messaging functionality.

Notifications generated by the device manager 155 at operation 265 can also indicate that additional steps must be taken by the user in order to implement the policy. For example, the policy can require a valid certificate for establishing a VPN connection. If the user has not been issued the certificate, or if the certificate has expired, the notification can inform the user that a new certificate is required. The user can then request a new certificate according to the enterprise policies 130. When the new certificate has been issued, the policy can be implemented automatically or when the user indicates that the issue has been resolved.

In another example, the policy can relate to security software requirements. If the device manager 155 determines that the private device 110 does not include security software that meets the enterprise policy requirements, the user can be notified that security software on the private device 110 must be installed or updated in order to proceed. The notification can optionally include instructions and/or links for finding and installing the required security software. In some embodiments, implementing a security policy can include installing a mobile security application from the enterprise applications 140. The enterprise mobile security application can then monitor and update the security components, data, and policies implemented on the private device 110.

When the policy has been implemented on the private device 110, or if it is determined at operation 260 that the selected policy is already in place on the private device 110, it is determined whether there are additional required enterprise policies 130 mapped to the requested action. This is illustrated at operation 270. However, operations 265 and 270 can be reversed in some embodiments. That is, the minimum number of mapped enterprise policies 130 to be implemented on the private device 110 can be determined prior to implementing any of the enterprise policies 130.

If additional required enterprise policies 130 are identified at operation 270, a next policy is selected from the additional required enterprise policies 130, and process 200-2 returns to operation 260 to determine whether the next policy is already in place on the private device 110. However, if there are no remaining required enterprise policies 130, the device manager 155 determines that all of the required enterprise policies 130 are in place on the private device 110, and allows the requested action to proceed. This is illustrated at operation 275. In some embodiments, the requested action is carried out on a virtual machine that is provided to the private device 110. However, the requested action can also be carried out using the operating system of the private device 110.

After the requested action has been allowed, it is determined whether the requested action is complete. This is illustrated at operation 280. In some embodiments, the device manager 155 can periodically or continuously monitor the private device 110 in order to determine whether the requested action is ongoing. The device manager 155 can determine that the requested action is complete when each step in the requested action has been carried out, when software applications 134 and/or 140 involved in carrying out the requested action have been exited or have entered an inactive or suspended state, and/or when no activity has been detected on the private device 110 for a preset amount of time. In some embodiments, access to the enterprise environment 120 is granted for a limited time (e.g., one hour), and the requested action is considered complete when the time period ends.

The device manager 155 can also generate a pop-up message inquiring whether the requested action is still in progress after a preset amount of time. If the user confirms that the requested action is still in progress (e.g., by clicking a button or entering text via the pop-up message) the device manager 155 determines that the requested action is not complete. However, if there is no confirmation after a preset length of time, the device manager 155 can determine that the requested action is complete. Further, the user can enter a manual notification when the requested action is finished in some embodiments.

If the device manager 155 determines that the requested action is not complete, process 200-2 returns to operation 275, and the device manager 155 allows the requested action to continue. However, if the requested action is complete, the enterprise policies 130 implemented at operation 265 are removed from the private device 110. This is illustrated at operation 285. The removal is implemented by the device manager 155, which reverses any changes made to the private device 110 during the policy implementation at operation 265. However, the device manager 155 does not remove policies 130 or associated data that were already in place on the private device 110 at operation 265. In some embodiments, the user can be notified before the device manager 155 removes the implemented enterprise policies 130.

Figure 3:
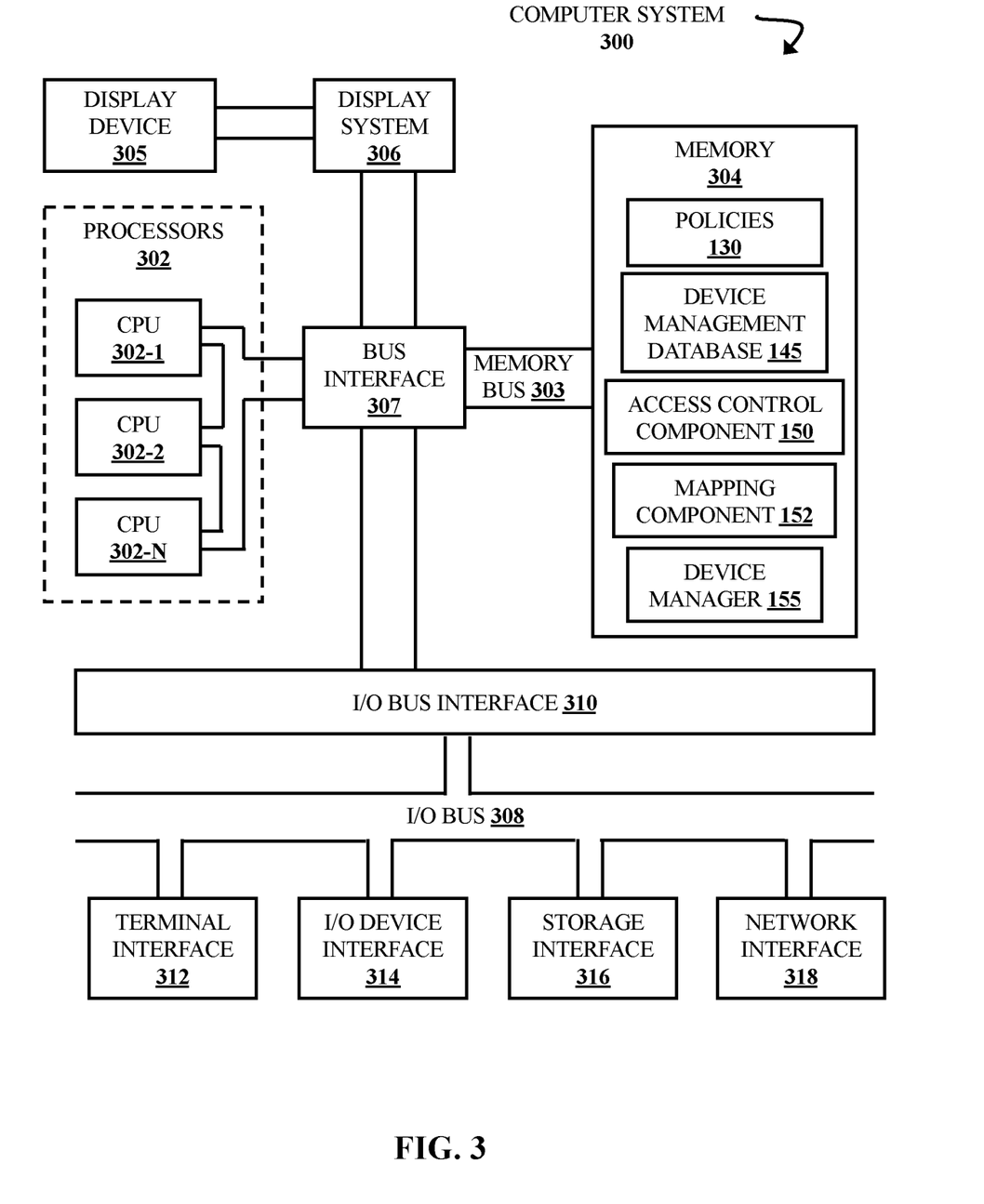
FIG. 3 is a block diagram illustrating a computer system, according to some embodiments of the present disclosure.

FIG. 3 is a high-level block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, a storage interface 316, an input/output device interface 314, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302-1, 302-2, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 310 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300, and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures. The memory 304 also contains a set of enterprise policies 130, a device management database 145, an access control component 150, a mapping component 152, and a device manager 155 (illustrated in FIG. 1).

These components are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though the set of enterprise policies 130, the device management database 145, the access control component 150, the mapping component 152, and the device manager 155 are illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, the set of enterprise policies 130, the device management database 145, the access control component 150, and the mapping component 152 include instructions that execute on the processor 302 or instructions that are interpreted by instructions that execute on the processor 302 to carry out the functions as further described in this disclosure. In another embodiment, the set of enterprise policies 130, the device management database 145, the access control component 150, the mapping component 152, and the device manager 155 are implemented in hardware via semiconductor devices, chips, logical gates, circuits, circuit cards, and/or other physical hardware devices in lieu of, or in addition to, a processor-based system. In another embodiment, the set of enterprise policies 130, the device management database 145, the access control component 150, the mapping component 152, and the device manager 155 include data in addition to instructions.

Although the memory bus 303 is shown in FIG. 3 as a single bus structure providing a direct communication path among the CPUs 302, the memory subsystem 310, the display system 306, the bus interface 307, and the input/output bus interface 310, the memory bus 303 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305. The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface, but receives requests from other computer systems (clients). Further, in some embodiments, the computer system 300 is implemented as a desktop computer, portable computer, laptop or notebook computer, tablet computer, pocket computer, telephone, smartphone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
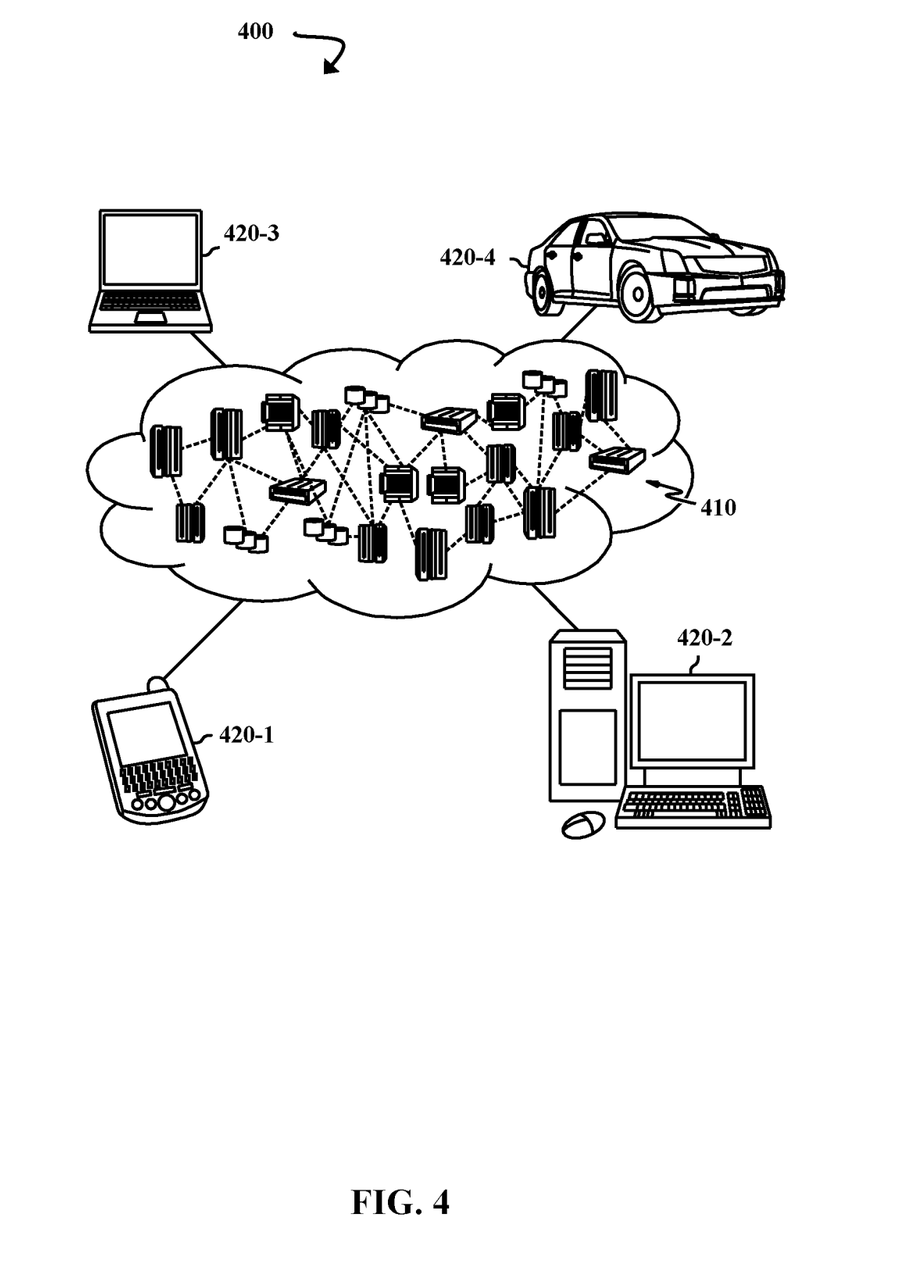
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, a personal digital assistant (PDA) or cellular telephone 420-1, a desktop computer 420-2, a laptop computer 420-3, the enterprise device 125 and private device 110 (illustrated in FIG. 1), and/or an automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1-420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
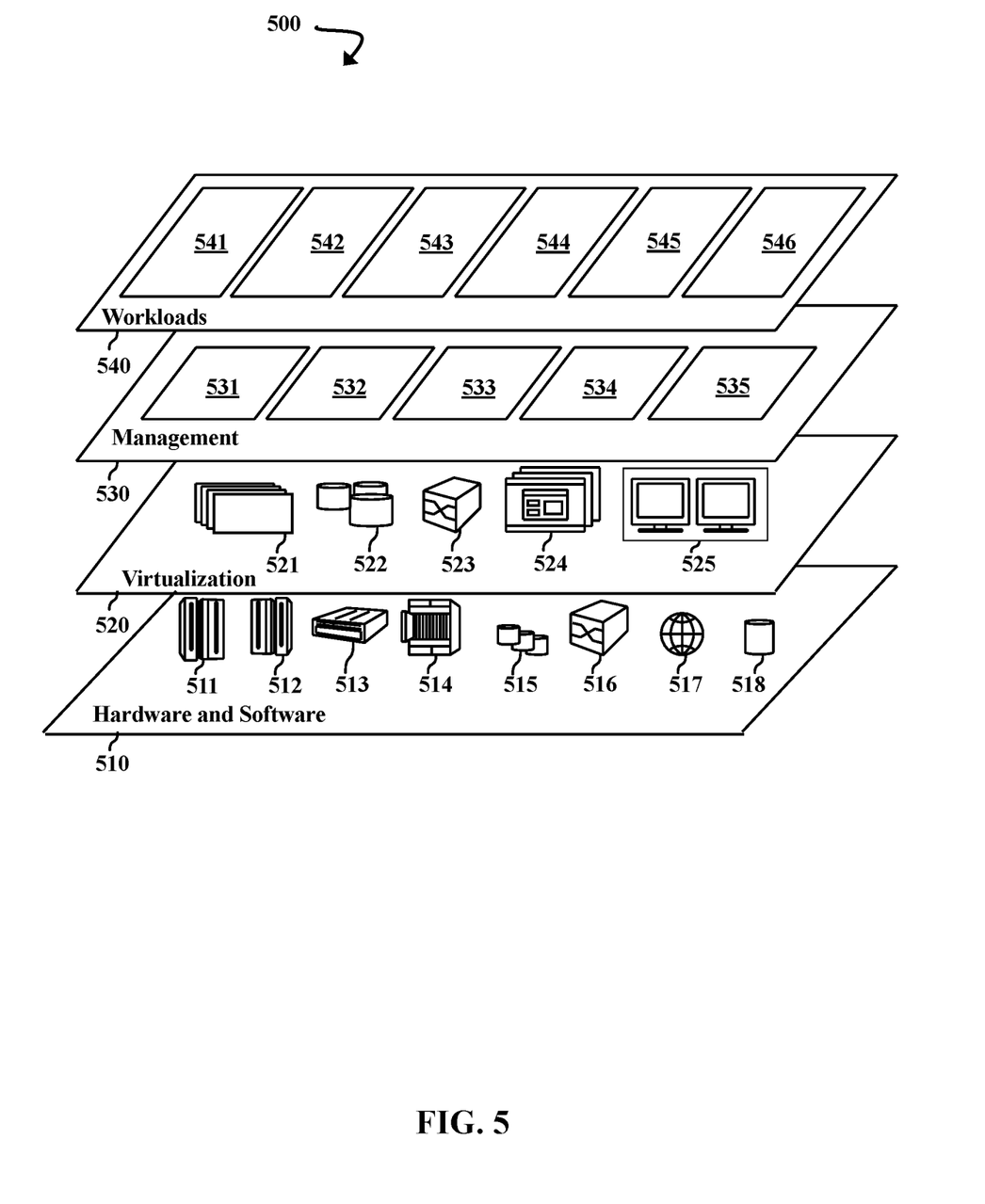
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include: mapping and navigation 541; software development and lifecycle management 542; virtual classroom education delivery 543; data analytics processing 544; transaction processing 545; and temporary implementation of selected enterprise policies 546.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

What is claimed is:

1. A method of allowing access to an enterprise environment, comprising:
   receiving a request to carry out an action from a private device;
   verifying that the request is from a user associated with an enterprise device;
   verifying that the private device is associated with the enterprise device;
   in response to the verifications, defining steps for carrying out the requested action;
   identifying a set of enterprise policies implemented on the enterprise device;
   providing a virtual machine that implements the set of enterprise policies, wherein each of the enterprise policies on the virtual machine is set to prohibit all associated action steps;
   attempting, on the virtual machine, each of the steps for carrying out the requested action;
   receiving a warning prompt each time a step from the attempted steps is prohibited by an enterprise policy on the virtual machine;
   in response to each warning prompt, mapping the prohibited step to the prohibiting enterprise policy;
   determining whether each mapped prohibiting enterprise policy is in place on the private device; and
   allowing the private device to carry out the requested action when each mapped prohibiting enterprise policy is in place on the private device;
   determining that a mapped prohibiting enterprise policies is not in place on the private device;
   prior to the allowing, implementing the mapped prohibiting enterprise policy on the private device;
   determining that the requested action has been completed; and
   removing the implemented mapped prohibiting enterprise policy from the private device.

2. The method of claim 1, further comprising mapping the prohibiting enterprise policy to the requested action.

3. The method of claim 1, wherein the enterprise device includes an application associated with the private device.

4. The method of claim 1, wherein the private device is not allowed to carry out actions other than the requested action.

5. The method of claim 1, further comprising determining that a default enterprise policy is in place on the private device.

6. The method of claim 1, wherein the enterprise device is on a list of devices recognized by the enterprise environment.

7. The method of claim 6, wherein the list is maintained by a device management database.

8. The method of claim 6, wherein the verifying that the private device is associated with the enterprise device comprises determining that a record of the private device is on the list.

9. The method of claim 8, wherein the record of the private device is mapped to the enterprise device on the list.

10. The method of claim 8, wherein the record of the private device is mapped to the user.

11. The method of claim 1, wherein the verifying that the request is from the user comprises requiring that the user sign into an enterprise account.

12. The method of claim 1, further comprising:
    determining that the requested action has been completed; and
    in response to the determining that the requested action has been completed, removing data associated with the enterprise policies from the private device.

13. The method of claim 1, further comprising defining at least one of the steps for carrying out the requested action before receiving the request.

14. The method of claim 1, further comprising receiving a request for access to the enterprise environment before receiving the request to carry out the action.

15. The method of claim 14, further comprising:
    verifying that the request for access is from the user; and
    granting the request for access.

16. The method of claim 1, wherein an enterprise policy from the set of enterprise policies is not required for carrying out the requested action.

17. The method of claim 16, wherein the unrequired enterprise policy is not implemented on the private device.

18. The method of claim 1, further comprising, in response to each warning prompt, permitting the prohibited step on the virtual machine.

* * * * *